(12) United States Patent
Parrish et al.

(10) Patent No.: US 7,115,225 B2
(45) Date of Patent: Oct. 3, 2006

(54) PSEUDO INSERT MOLDING FOR TRIM PARTS USING POLYURETHANE SPRAY PROCESS

(75) Inventors: Kenneth R. Parrish, Roseville, MI (US); Jean-Jacques Katz, Novi, MI (US); Gordon L. Ebbitt, Ann Arbor, MI (US); Barry R. Wyerman, Novi, MI (US)

(73) Assignee: Lear Corporation, Southfield, MI (US)

( * ) Notice: Subject to any disclaimer, the term of this patent is extended or adjusted under 35 U.S.C. 154(b) by 273 days.

(21) Appl. No.: 10/453,196

(22) Filed: Jun. 3, 2003

(65) Prior Publication Data

US 2004/0244903 A1 Dec. 9, 2004

(51) Int. Cl.
*B29C 41/22* (2006.01)

(52) U.S. Cl. ............. 264/243; 264/257; 264/271.1; 264/309; 264/324; 264/DIG. 72

(58) Field of Classification Search .......... 264/243, 264/246, 257, 271.1, 324, DIG. 72, 309
See application file for complete search history.

(56) References Cited

U.S. PATENT DOCUMENTS

| | | | |
|---|---|---|---|
| 4,251,476 A | 2/1981 | Smith | |
| 5,059,671 A | 10/1991 | Taniguchi et al. | |
| 5,082,609 A | 1/1992 | Rohrlach et al. | |
| 5,273,698 A * | 12/1993 | Thary | 264/46.4 |
| 5,389,317 A * | 2/1995 | Grimmer | 264/46.5 |
| 6,251,323 B1 * | 6/2001 | Hoedl et al. | 264/254 |
| 6,352,658 B1 * | 3/2002 | Chang et al. | 264/46.4 |
| 6,378,836 B1 * | 4/2002 | Anthony | 249/114.1 |

FOREIGN PATENT DOCUMENTS

| | | |
|---|---|---|
| EP | 0 376 674 A1 | 7/1990 |
| GB | 1380910 | 1/1975 |
| GB | 2 401 342 A | 11/2004 |
| JP | 61 227 025 A | 10/1986 |
| JP | 61227025 A * | 10/1986 |
| JP | 10146854 A | 6/1998 |

* cited by examiner

*Primary Examiner*—Edmund H. Lee
(74) *Attorney, Agent, or Firm*—Brooks Kushman P.C.

(57) ABSTRACT

A method of making a composite part including an insert and an elastomer layer that is bonded to the insert. The insert is placed in a mold and an uncured elastomer is sprayed into the mold to form a composite part. The inherent adhesive properties of the uncured elastomer is the sole mechanism for bonding the elastomer to the insert.

4 Claims, 3 Drawing Sheets

PSEUDO INSERT MOLDING FOR TRIM PARTS USING POLYURETHANE SPRAY PROCESS

BACKGROUND OF THE INVENTION

1. Field of the Invention

The present invention relates to the manufacture of interior trim parts for vehicles wherein the part is backed by an elastomeric polyurethane layer.

2. Background Art

Many parts for vehicles are manufactured with an elastomeric or rubber-like layer on one side. For example, removable floor mats (also known as throw in place mats), load floors, package shelves, spare tire covers and many other parts are made with such an elastomeric or rubber-like layer. Conventional ways of manufacturing such parts include sewing or adhesively bonding an elastomeric layer to a preformed structural part or carpet piece. Sewing is labor-intensive and relatively costly while the more common adhesive bonding process requires assembly operations and extensive use of expensive adhesives because in some applications they must remain flexible after curing.

There is a need for a reliable and cost-effective process for manufacturing interior trim parts having an elastomeric backing layer. Any such process must offer a durable and high quality part that meets or exceeds original equipment manufacturer's standards.

SUMMARY OF THE INVENTION

According to the present invention, a method of making an interior trim part for a vehicle is provided. The method comprises providing a mold that defines a mold surface and loading an insert into the mold with a facing side of the insert being disposed on the mold surface. An elastomer material is sprayed partially on a backing side of the insert and partially on the mold surface. The elastomer is cured to form a composite interior trim part having an elastomer layer adhered to the insert that is then removed from the mold.

Further aspects of the method may include the fact that the insert may be a section of carpet-like material having pile on its facing side. The insert could also be another type of textile such as a non-woven fabric without pile or a different type of textile. The elastomer may be a spray applied polyurethane that may either be an aromatic or aliphatic polyurethane composition. The mold surface may be treated with a mold release compound before the loading step in the method described above.

The invention may also be summarized as a method of making an interior trim part for a vehicle wherein an elastomer material is initially sprayed on a mold surface in a mold cavity defined by a mold. The insert is loaded into the mold and placed on an upwardly facing surface of the elastomer material with a facing side of the insert facing upwardly and a backing side of the insert contacting the upwardly facing surface of the elastomer material. The backing side of the insert is bonded to the upwardly facing surface of the elastomer material and cured to form a composite trim part. The composite trim part is then removed from the mold as a finished part.

According to other aspects of the method described in the preceding paragraph, the insert may be a section of carpet-like material having pile on its facing side. Alternatively, the insert may be a subassembly made up of at least one piece that is separately formed before being loaded into the mold. The mold may be provided with a pattern formed by providing areas of greater and lesser depth that are transferred as a mirror image to the elastomer as it partially fills the mold cavity and provides a molded surface pattern on the composite part. The method may further comprise pressing on the facing side of the insert with an upper mold section during the bonding step.

The invention may also be summarized as a method of making a composite part that utilizes the inherent adhesive properties of uncured polyurethane elastomer material for bonding to an insert. The method includes the steps of providing a mold having a cavity that includes molding surface. An insert is placed in the mold in a predetermined location. An uncured polyurethane elastomer is sprayed into the mold that has inherent adhesive properties prior to curing and bonding to the insert while the insert is in the mold. The inherent adhesive properties of the polyurethane elastomer are the sole mechanism for bonding the elastomer to the insert.

According to other aspects of the method of making a part that utilizes the inherent adhesive properties of uncured polyurethane elastomer described above, the insert may be placed in the mold either before or after the spraying step. The method may be used to make a composite part such as a floor mat, load floor, package shelf, or spare tire cover. The spraying step is performed within a cycle time that is less than a predetermined amount of time that the polyurethane elastomer possesses adhesive properties sufficient to bond to the insert. The insert is placed in the mold after the spraying step is completed and before the predetermined time expires within which the inherent adhesive properties are sufficient to bond the insert to the polyurethane. The predetermined location in the mold may be defined by a surface feature of the mold surface.

These and other aspects of the present invention will be better understood with reference to the attached drawings and following detailed description of the various modes of the invention.

DETAILED DESCRIPTION OF THE PREFERRED EMBODIMENT(S)

Figure 1:
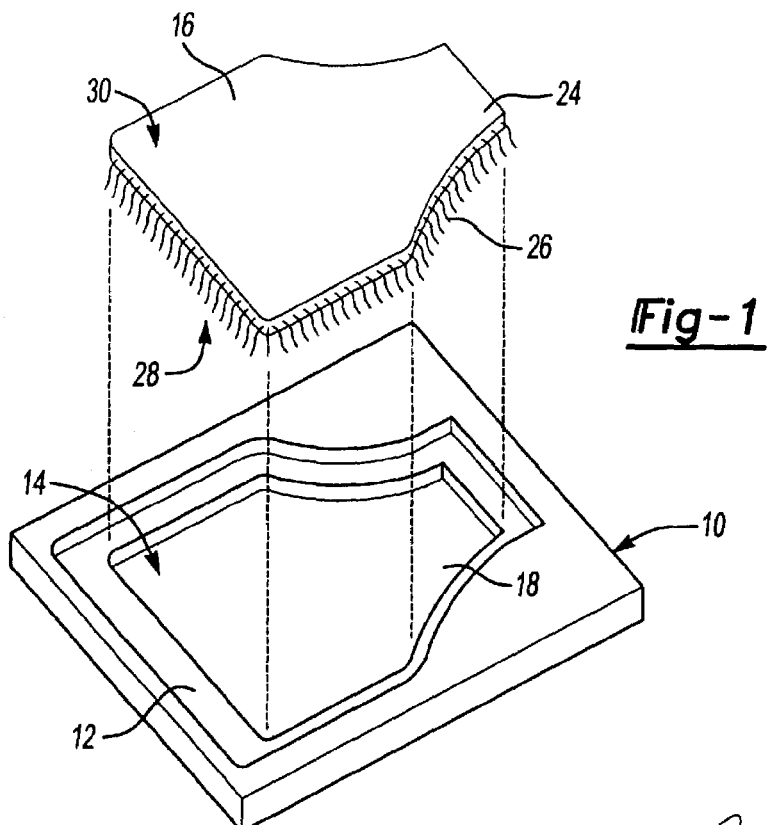
FIG. 1 is an exploded perspective view showing a mold and section of carpet-like material prior to loading into the mold.

Referring now to FIG. 1, a mold for forming a part is generally indicated by reference numeral 10. The mold 10 has a mold surface 12 defined within a mold cavity generally indicated by reference numeral 14. An insert 16 is shown above the mold 10 prior to being inserted in the mold cavity 14. The insert 16 is placed in an insert mold cavity 18 that is defined within the mold cavity 14.

Figure 2:
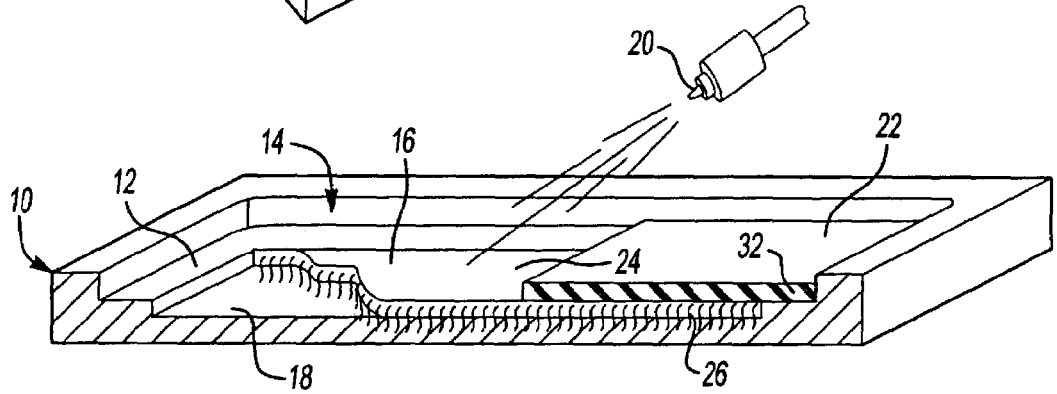
FIG. 2 is a fragmentary, partially cross-sectional perspective view showing a mold in which a carpet-like insert has been placed and over which an elastomer material is sprayed according to the method of the present invention.

Referring now to FIG. 2, the mold 10 is shown partially in cross-section with the insert 16 disposed in the insert mold cavity 18. A spray nozzle 20 is shown dispensing an elastomer to form an elastomer layer 22.

Referring to FIGS. 1 and 2, the illustrated insert 16 is a carpet-like insert having a backing layer 24, or sizing, and pile 26. The pile 26 is on the facing side 28 of the insert 16. By facing side 28, it is to be understood that this side of the insert 16 is intended to generally face the interior of a vehicle. However, it should be understood that the facing side 28 could be faced downwardly to reduce wear or protect the pile from dirt or contaminants. The backing layer 26 is on a backing side 30 of the insert 16. A peripheral portion 32 may be formed by spraying an elastomer into the mold 10 so that the elastomer layer 22 extends around the periphery of the insert 16. If a peripheral portion 32 is provided, the insert 16 will have an elastomeric edge formed around the insert 16 on the facing side 28. The backing layer 26 could also be coextensive with the insert 16 in which case there would not be a peripheral portion.

Figure 3:
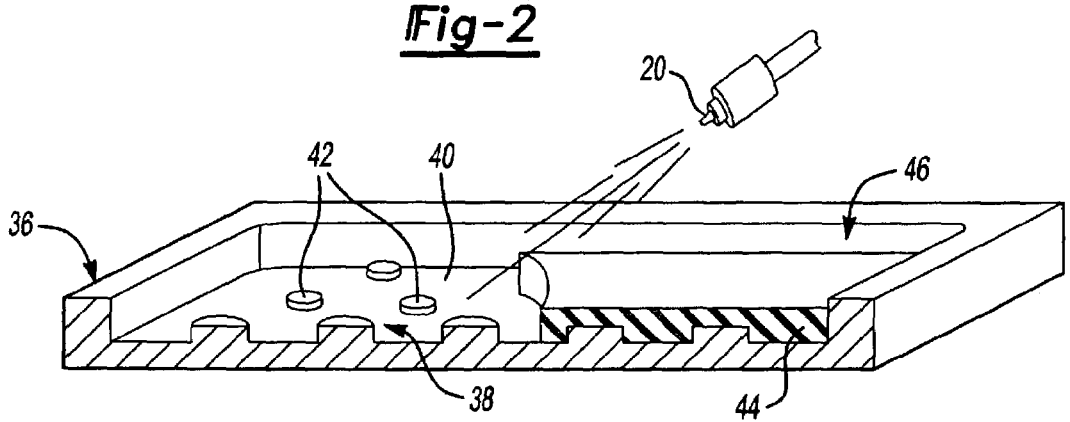
FIG. 3 is a fragmentary, partially cross-sectional perspective view showing a mold having a mold surface with surface features over which an elastomer is sprayed according to an alternative embodiment of the present invention.

Referring to FIG. 3, an alternative embodiment of a mold is generally indicated by reference numeral 36. The mold 36 includes a mold surface 38 that includes a base 40 and surface design elements 42. An elastomer layer is applied to the mold surface 32 by spray nozzle 20. The elastomer layer 44 is sprayed directly on the mold surface 38 and accumulates within a mold cavity 46 until the elastomer layer 44 accumulates to a desired thickness. The elastomer layer 44 has areas of different thickness with areas of greater thickness being formed where the elastomer layer 44 is sprayed on the base 40 and areas of reduced thickness where the elastomer layer 44 is sprayed over the surface design elements 42. While the surface design elements 42 shown are raised from the base 40, they could also be recessed into the base to form projections on the molded layer.

Figure 4:
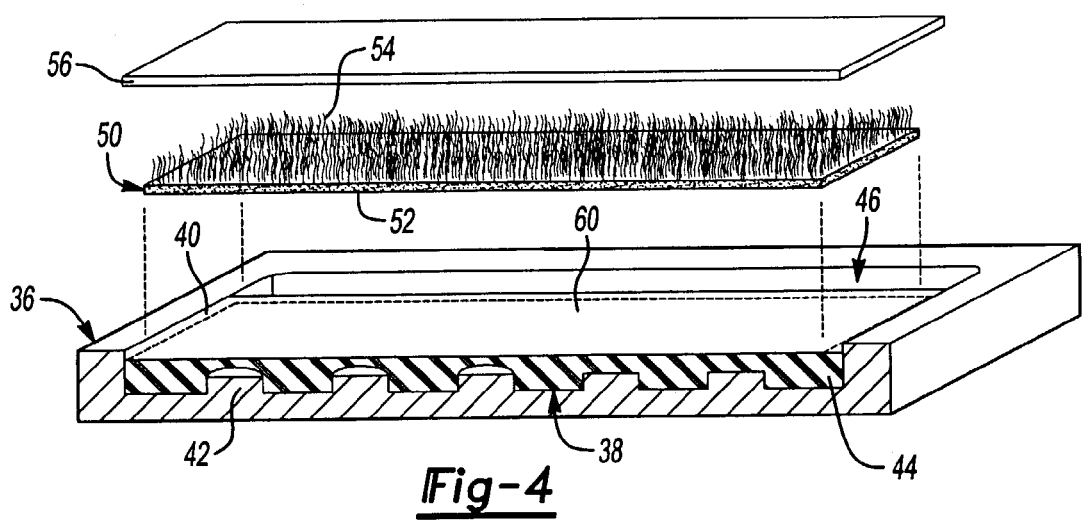
FIG. 4 is a fragmentary, partially cross-sectional view of the mold as shown in FIG. 3 after the elastomer has been sprayed in the mold cavity with a carpet-like insert disposed above the mold cavity with an upper mold part above the insert that is adapted to press the insert into the elastomer layer according to another aspect of the invention.

Referring to FIG. 4, the mold 36 illustrated in FIG. 3 is shown after the elastomer layer 44 is applied to the mold surface 38. Insert 50 includes a backing 52 and pile 54 on opposite sides thereof. The insert 50 is placed in the mold on the elastomer layer 44. The insert 50 must be placed in the mold 36 shortly after the elastomer layer 44 is sprayed on the mold surface 38. The elastomer is compounded so that it is cured within a reasonable time while allowing a period during which the insert 50 may bond to the elastomer layer 44 as a result of its inherent adhesiveness prior to curing. For example, the cycle time required to spray the elastomer and fully form the elastomer layer 44 may be approximately 15 seconds while the time period during which the elastomer layer 44 can be expected to bond to the backing 52 of the insert 50 may be up to 30 seconds. This would leave 15 seconds within which to place the insert 50 on the elastomer layer 44. The time window may be controlled depending upon the size of the elastomer layer 44 that is to be formed, the speed of application (that result in an expected elastomer application time) and by the composition of the elastomer. The ratio of resin to catalyst may be modified to provide an adequate time window during which the elastomer layer 44 is sufficiently adhesive to bond to insert 50 with the final cure being achieved within the acceptable cycle time for manufacturing the composite part.

An upper mold part 56 is shown above the insert 50. The upper mold part 56 would be supported by a mold tool (not shown) that would be used to press the upper mold part 56 evenly against the insert 50. The pressure applied by the upper mold part 56 is intended to facilitate bonding the insert 50 to the elastomer layer 44.

Figure 5:
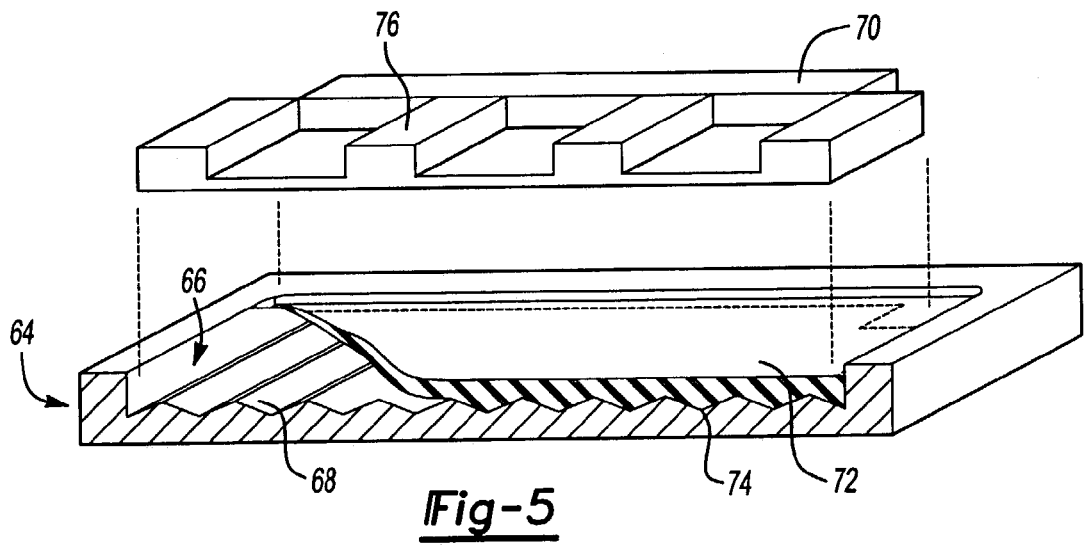
FIG. 5 is a fragmentary, partially cross-sectional view of a mold having a contoured mold surface with a layer of elastomer sprayed on the mold surface and a subassembly disposed above the mold shown ready to be secured to the elastomer layer in accordance with yet another embodiment of the invention.

Referring to FIG. 5, an alternative embodiment of a mold is generally indicated by reference numeral 64. The mold 64 includes a mold cavity generally indicated by reference numeral 66. The mold cavity 66 has a ribbed lower surface 68. An insert assembly 70 is shown above the mold cavity 66 that is intended to be bonded to an elastomer layer 72 that is applied as previously described. As the elastomer layer 72 is applied to the mold cavity 66, a series of ribs 44 may be formed on the ribbed lower surface 68 of the mold cavity 66. The ribs 74 has some areas of greater thickness and other areas of lesser thickness. The insert assembly 70 may be formed in one piece or may be formed with reinforcements 76. Reinforcements 76 may be integral with the insert assembly or formed as a multi-part subassembly. The insert assembly 70 is placed in the mold 64 after the elastomer layer 72 has been applied to the mold 64 but before the elastomer is cured. By inserting the insert assembly 70 into the mold cavity 76 while the elastomer layer 72 is adhesive, the elastomer layer 72 can be adhered to the insert assembly 70. An upper mold part such as that identified by reference numeral 56 in FIG. 4 above may be provided to press the insert onto the elastomer layer 72. Alternatively, the weight of the insert assembly 70 or manually applied pressure may be sufficient to join the insert assembly 70 to the elastomer layer 72.

Figure 6:
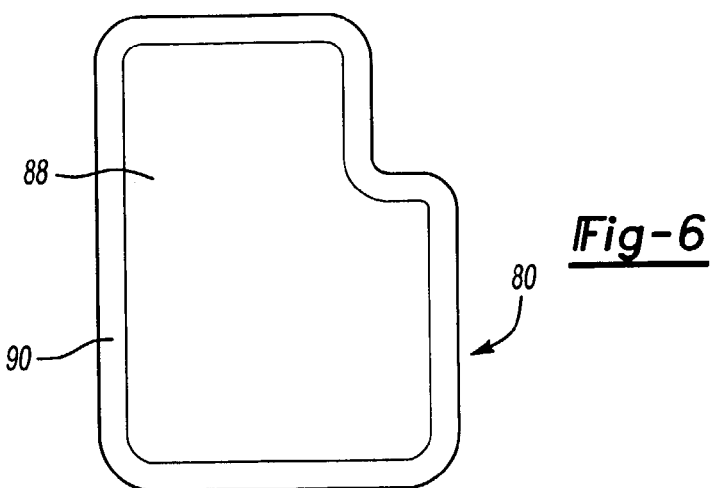
FIG. 6 is a plan view of a floor mat that can be made according to the method of the present invention.

Referring to FIG. 6, one example of a composite part that may be made according to the process of the present invention is a floor mat 80.

Figure 7:
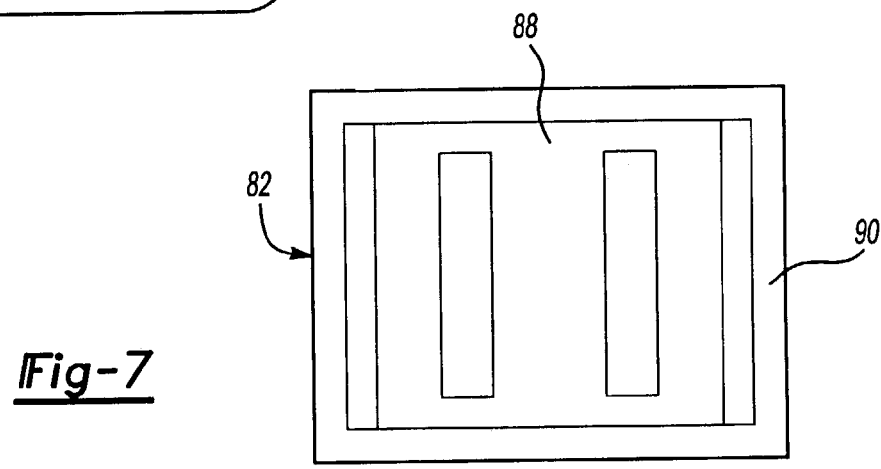
FIG. 7 is a plan view of a load floor that may be made according to the method of the present invention.

Referring to FIG. 7, another composite assembly that may be made according to the process is a load floor 82.

Figure 8:
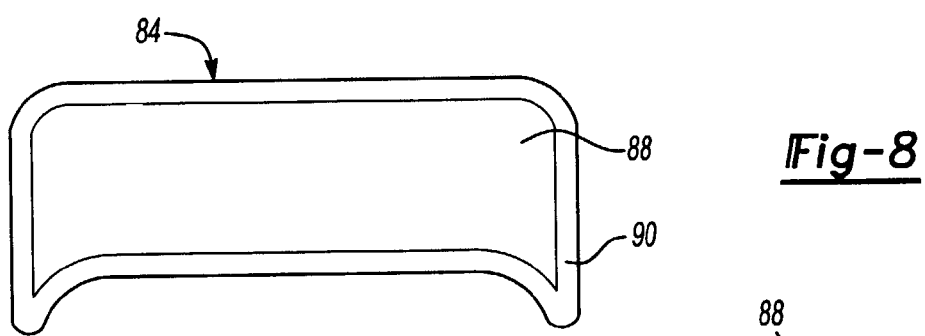
FIG. 8 is a plan view of a package shelf that may be made according to the method of the present invention.

Referring to FIG. 8, another composite part that may be made according to the process is a package shelf 84.

Figure 9:
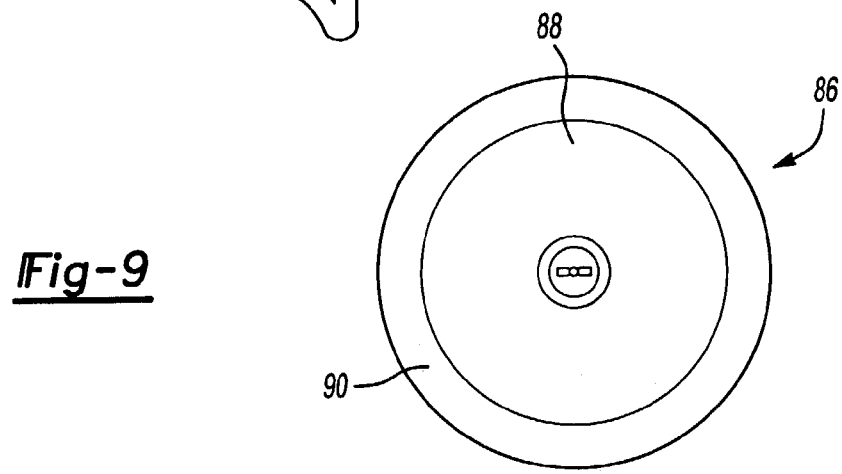
FIG. 9 is a plan view of a spare tire cover that may be made according to the method of the present invention.

A spare tire cover 86 that may be made according to the process is illustrated in FIG. 9. The interior trim parts illustrated in FIGS. 6–9 each include an insert 88 that is adhered to an elastomer layer 90. The insert 88 is attached to the elastomer layer 90 while the elastomer layer has sufficient inherent adhesive properties prior to curing so that the elastomer layer 90 is the sole mechanism for bonding the elastomer to the insert.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of making an interior trim part for a vehicle, comprising:

providing a mold that defines a mold surface in a mold cavity wherein the mold has a pattern defined by the mold surface that has areas of greater depth and areas of lesser depth;

spraying an elastomer material on the mold surface to partially fill the mold cavity wherein the areas of greater depth are filled by spraying to a greater depth than the areas of lesser depth;

loading an insert into the mold and onto an upwardly facing surface of the elastomer material with a facing side of the insert facing upwardly and a backing side of the insert contacting the upwardly facing surface of the elastomer material;

bonding the backing side of the insert to the upwardly facing surface of the elastomer material;

curing the elastomer material to form a composite trim part having areas of a molded surface pattern on the composite part defined by the greater and lesser depth; and removing the composite part from the mold.

2. The method of claim 1 wherein the insert is a section of carpet material having pile on the facing side.

3. The method of claim 1 wherein the insert is a subassembly having at least one piece that is separately formed before being loaded into the mold.

4. The method of claim 1 further comprising the step of pressing on the facing side of the insert with an upper mold section during the bonding step.

* * * * *